United States Patent [19]

Vida et al.

[11] Patent Number: 4,581,878
[45] Date of Patent: Apr. 15, 1986

[54] MULTI-ROW ADAPTER FOR THE COMPLETE HARVESTING OF CORN OR SUNFLOWER

[75] Inventors: Mihály Vida; Mátyás Liker, both of Békéscsaba; Mátyás Klement, Budapest, all of Hungary

[73] Assignee: Békéscsabai Mezogazdasagi Gepgyarto es Szolgaltato Vallalat, Békéscsaba, Hungary

[21] Appl. No.: 601,982

[22] Filed: Apr. 19, 1984

[51] Int. Cl.[4] .................................... A01D 45/02
[52] U.S. Cl. ..................................... 56/114; 56/104; 56/113; 130/5 G; 130/5 E
[58] Field of Search ............... 56/14.1, 14.3, 64, 66, 56/103-108, 98, 119, 113-115, 126, 127; 130/4, 5 B, 5 C, 5 D, 5 R

[56] References Cited

U.S. PATENT DOCUMENTS

| | | | |
|---|---|---|---|
| 1,351,665 | 8/1920 | Logarzo | 56/64 |
| 1,722,717 | 7/1929 | Trottman | 56/66 |
| 2,614,378 | 10/1952 | Barnard et al. | 56/119 |
| 2,770,087 | 11/1956 | Hurlbut | 56/66 |
| 3,707,833 | 1/1973 | Sutton | 130/5 C |
| 3,982,385 | 9/1976 | Hyman | 130/5 D |
| 4,251,980 | 2/1981 | Miller | 56/98 |
| 4,333,304 | 6/1982 | Greiner et al. | 56/119 |

FOREIGN PATENT DOCUMENTS

| | | | |
|---|---|---|---|
| 591063 | 1/1960 | Canada | 56/104 |
| 2210635 | 9/1973 | Fed. Rep. of Germany | 56/113 |
| 144068 | 1/1962 | U.S.S.R. | 56/103 |

OTHER PUBLICATIONS

Deutsche Agrartechnik, Jun. 1970, p. 261.

Primary Examiner—Gene Mancene
Assistant Examiner—John G. Weiss
Attorney, Agent, or Firm—Karl F. Ross; Herbert Dubno

[57] ABSTRACT

An adapter for use with sunflower head combines or corn harvesters in which the stalks are cut from the ground and ride upon closed-bottom channels from which they pass between rollers to be deposited in a swath on the ground while the corn and sunflower heads are separated by strippers cooperating with conveyors displacing the stalks along the channels.

4 Claims, 10 Drawing Figures

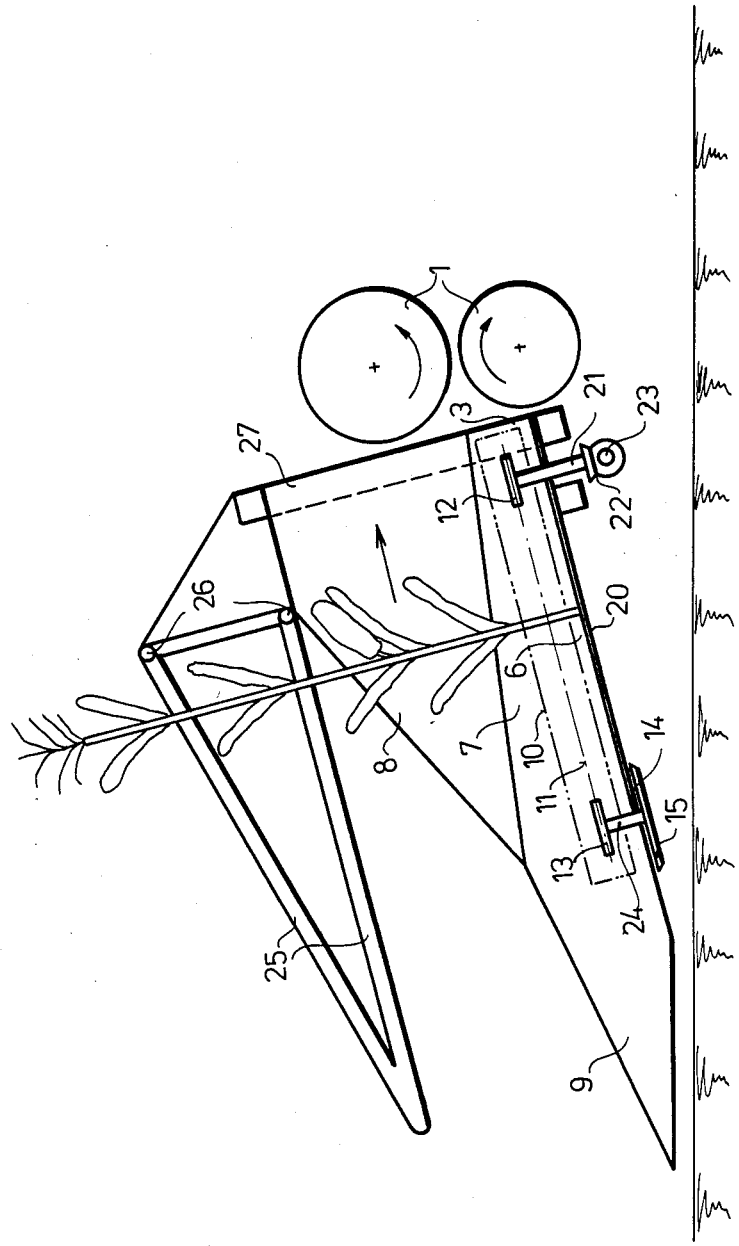

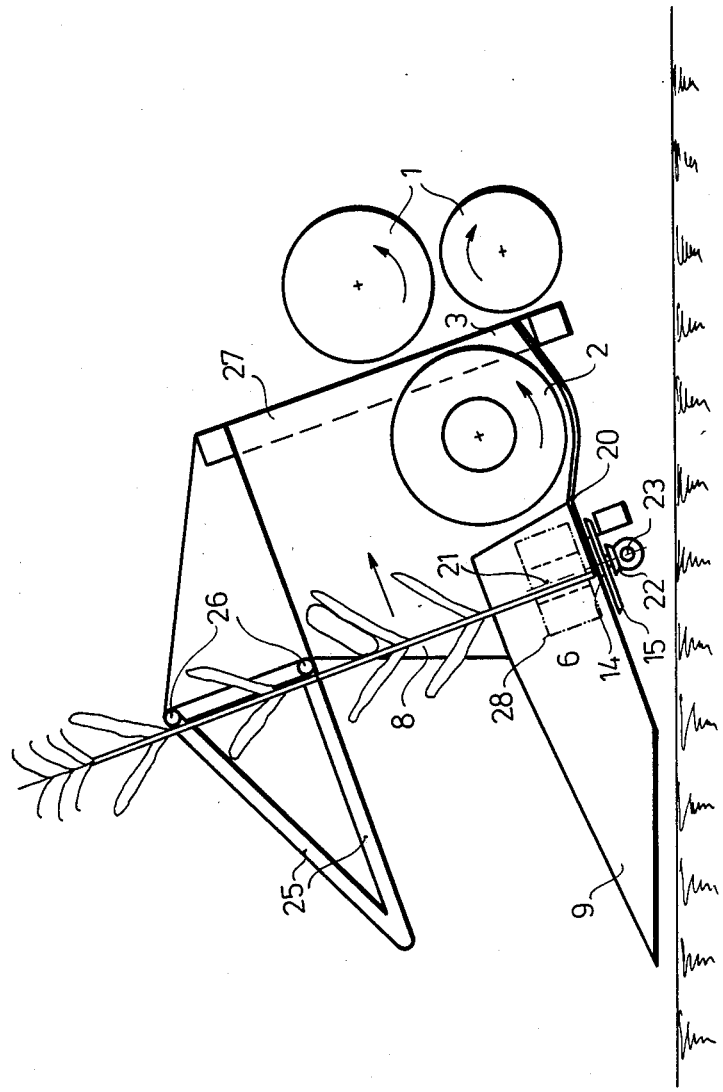

MULTI-ROW ADAPTER FOR THE COMPLETE HARVESTING OF CORN OR SUNFLOWER

FIELD OF THE INVENTION

Our present invention relates to a multi-row adapter for the complete harvesting of row crops, particularly corn and sunflower, which is connected through its feeding hole directly or through gathering auger to the transport of the combine feeder assembly, or to a pair of gathering rolls of the chopper machine feeder assembly, and on which elevator channels which are parallel or converging toward the feeding hole are arranged along a common plane at acute angle to the horizontal, provided with endless gathering chains fitted with augers or other transport assemblies and the front part of the elevator channels is provided with cutter assemblies or with transport parts rotating around common shafts with the cutter assemblies and/or around counter shafts.

BACKGROUND OF THE INVENTION

The most widely used method within the province of the invention is represented by the corn picker heads mounted on the different combines. The construction of nearly all corn picker heads known has been similar. Gathering chains, snapping strips and gathering rolls are arranged along parallel rows, and driven through an angular gear box in each row. The crop is transported by an auger or sloping elevator.

The FKA-type corn picker heads can be provided also with stalk swather adapter consisting of left and right-side units mounted below the adapter, provided with an alternately moving mower assembly and console-type pair of augers.

Also known are the gathering auger adapters suitable for the harvesting of sunflowers. Here the crop is transported by augers driven through angular gear boxes rotating at high peripheral speed along the length of the rows parallel to the cutting auger at the inside end of the augers, then to the gathering auger and sloping elevator.

The unfavorable properties of the known methods are characterized in that apart from being single-purpose units, their construction is complicated, the gross weight, power requirement and capital cost are high, and they do not allow the harvesting of the stalk.

The above described drawbacks are even more valid for the corn picker head fitted with a stalk swather which allows the harvesting of the stalks but is functionally sensitive to the condition of the crop and reduce the capacity of the machine.

The NA-type assemblies (bucket elevators, reel, shield, etc.) of the harvesting part of the different combine harvesters are generally used for sunflower harvesting.

Also known are the corn picker heads suitable for the harvesting of sunflowers with the aid of cutter assemblies at the ends of the gathering rolls. One such four-row adapter is described in the French patent specification No. 242 63 97.

These units are disadvantageous in that the number of the harvested rows depends on the corn picker head because of, their complex construction and their gross weight, and because the reel and the gathering rolls result in inefficient operation and do not allow the harvesting of the stalks.

There are different parallel arranged direct cut headers connected through a gathering auger to the basic machine, as well as converging adapters directly connected to the basic machine suitable for the harvesting of soya and silage corn. Apart from being mainly single-purpose units, these machines are expensive and do not allow economical mass production.

The appearance of high capacity combines and forage harvesters including their suitability for several technological processes necessitated the development of a large number of multi-purpose adapters, which meet agrotechnical requirements, and allow the harvesting of the stalks as a by-product. The proper utilization of the high capacity machines can be ensured only this way in accord with the possibilities and requirements of the large-scale farming, which require the economic production of the mass-produced, extensively standardized adapters.

OBJECT OF THE INVENTION

It is the object of the invention to provide a multi-purpose, extensively standardized multi-row adapter of simple construction connectable to the transport part of the combine, or to the gathering rolls of a forage harvesters feeder assembly, depending on the type of the crop and allowing the complete harvesting of the plant.

SUMMARY OF THE INVENTION

This object is achieved according to the invention with an adapter as described earlier by providing a pair of stalk gathering rolls is mounted on the end of the elevator channels at the feeding hole, and snapping strips are arranged above the pair of stalk gathering rolls.

Preferably a stalk gathering auger is built behind the pair of stalk gathering rolls, while crop transport parts are located above the snapping strips, and a crop gathering auger is arranged behind the snapping strips.

BRIEF DESCRIPTION OF THE DRAWING

The invention is described in detail with the aid of the accompanying drawing showing some suitable constructions of the adapter according to the invention. In the drawing:

FIG. 9 is a sectional side view of the six-row adapter augmented with an assembly as shown in FIGS. 4 and 5; and FIG. 10 is a sectional side view of the six-row adapter augmented with the assembly shown in FIGS. 6-7.

SPECIFIC DESCRIPTION

The direction of motion of the cut down crop in relation to the adapters mounted on the basic machine is shown with a black arrow in the diagram, while only the crop receiving part of the transport parts of the basic machine is illustrated. The envelope of the transport parts mounted on the gathering chains and the crop transport parts are shown by two dot-dash lines.

Figure 1:
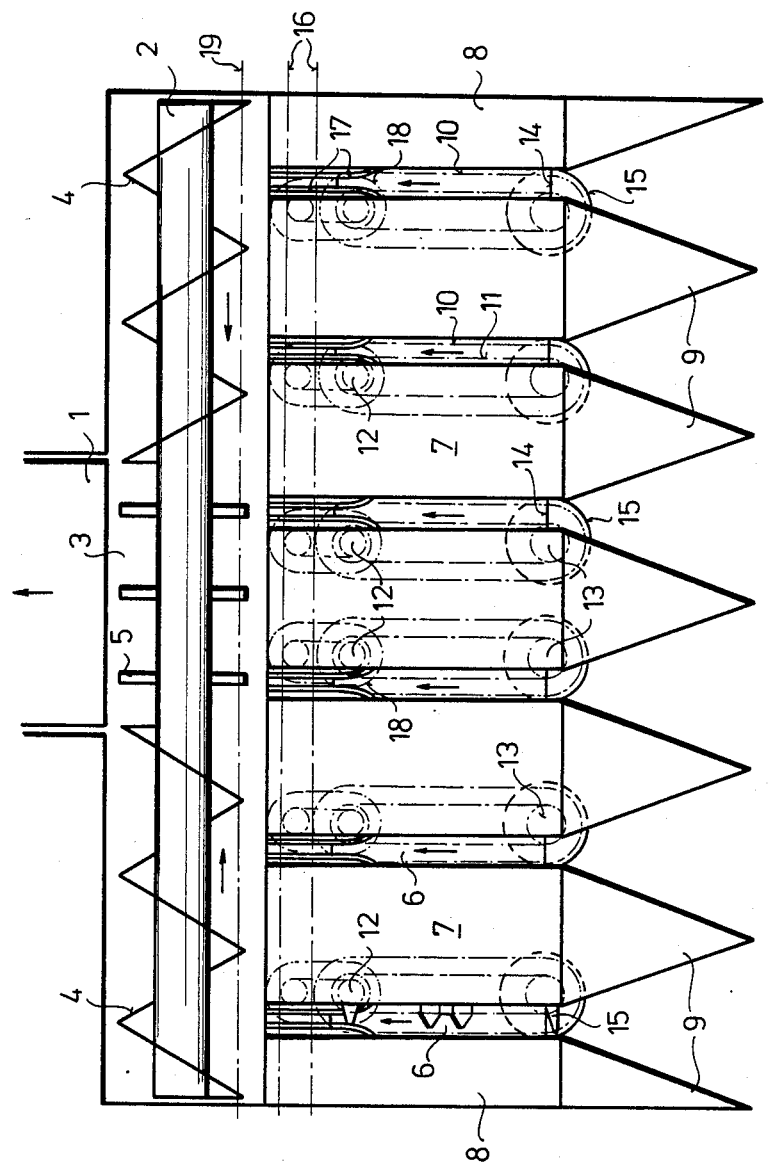
FIG. 1 is a top view of a six row, parallel channel adapter provided with a stalk gathering auger.

FIG. 1 shows a six-row parallel-channel adapter according to the invention.

The feeding hole 3 of the crop gathering auger 2 is directly ahead of the feeder assembly 1 in the direction of motion of the crop. Auger segments 4 are located both sides of the crop gathering auger 2, and radial throwing fingers 5 or throwing plates are provided at the feeding hole 3. Short, mutually parallel inclined elevator channels 6 are located ahead of the crop gathering auger 2, the adjacent elevator channels 6 or elevator rows being separated from each other by the enclosing shields 7, while the end elevator channels are surrounded by enclosing shields 8. Pointed toes 9 forming crop-row dividers are mounted on the enclosing shields 7 and 8 in the direction of motion of the basic machine for admission of the stalks.

Inclined gathering chains 11 provided with transport members 10 of suitable height and spaced according to the spacing of the stalks of the crop, suitably with blades are built as single-chain conveyors into each of the elevator channels 6 and driven through driving gears 13. Only two units of the transport parts 10 of the gathering chains 11 are shown in one of the extreme rows, those which are in the elevator channel 6. The gathering chains 11 naturally can be built into each of the elevator channel 6 as respective pairs of chains.

The cutter assembly 15 fitted with star-shaped blades provided with counter blades 14 is arranged on the shafts of the driven gears 13 of the gathering chains 11. Only those parts of the cutter assembly 15 fitted with star-shaped blades are shown in one of the extreme rows which are visible in the elevator channel 6, elsewhere only the envelope curve of these units is shown.

A pair of stalk gathering rolls 16 consisting suitably of several units is disposed between the crop gathering auger 2 and the elevator channels 6 at the end of the elevator channels at the feeding hole 3 at right angles to the direction of motion of the machine conforming to the width of the elevator channels 6. Only the centerline of the pair of the ribbed or toothed ribbed pair of stalk gathering rolls 16 is shown. The snapping strips 17 as a continuation of the elevator channels 6 are arranged on both sides above the pair of stalk gathering rolls 16, which are formed to be suitable for adjustment of the gap between them. The inward curving part of the snapping strips 17 ensures the admission of the stalks and it prevents their back feed.

Short conveyor chains driven through the shafts of the driving gears 12 of the gathering chains 11 are arranged above the snapping strips 17, on which reclining crop transport parts 18 of suitable height and suitably spaced according to the snapped crop are mounted. The crop transport parts 18 are arranged on a rotary disk directly on the shaft of the driving gears 12.

The stalk gathering auger 19 is behind the pair of stalk gathering rolls 16 or below the stalk gathering auger 2. Auger segments are arranged on both sides of the stalk gathering auger 19 similarly to the crop gathering auger 2, and throwing plates are in the centre at the discharge hole. Only the centreline of the stalk gathering auger 19 is shown.

Figure 2:
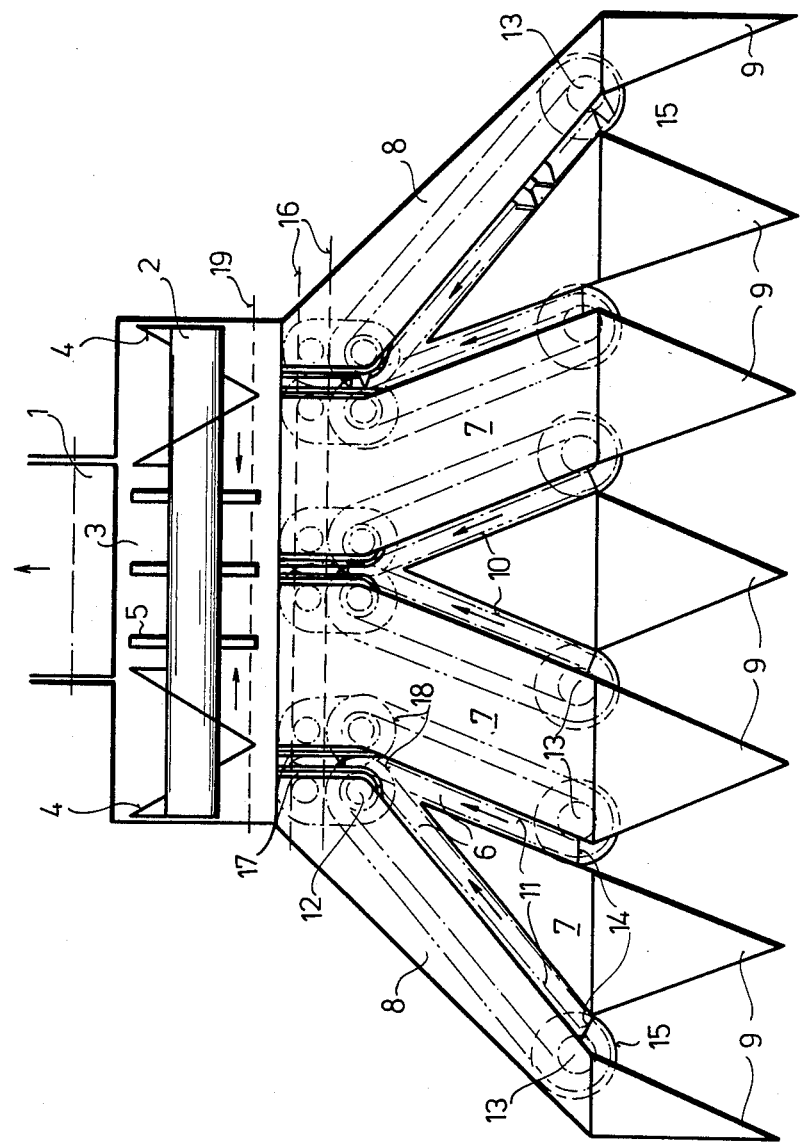
FIG. 2: Top view of a six-row converging-channel adapter provided with a stalk gathering auger

FIG. 2. shows the six-row converging adapter according to the invention. The converging rows are connected to the short crop gathering auger 2. The gathering chains 11 used as a single chain are co-ordinated as a pair of chains directly before the feeding hole 3 of the elevator channels 6.

For the purpose of extensive standardization the multi-row adapter can be constructed also by repetition of the two intermediate converging rows as a further variation.

The pair of stalk gathering rolls 16 are arranged at the end of the elevator channels 6 at the feeding hole 3 at right angle to the direction of motion of the machine, and the snapping strips 17 are above the pair of stalk gathering rolls 16, while the conveyor chains fitted with crop transport parts 18 are above the snapping strips 17.

The stalk gathering auger 19 is behind the the pair of stalk gathering rolls 16 and below the crop gathering auger 2. The stalk gathering auger 19 may be dispensed with, depending on the number of rows and on the width of the required range.

Figure 3:
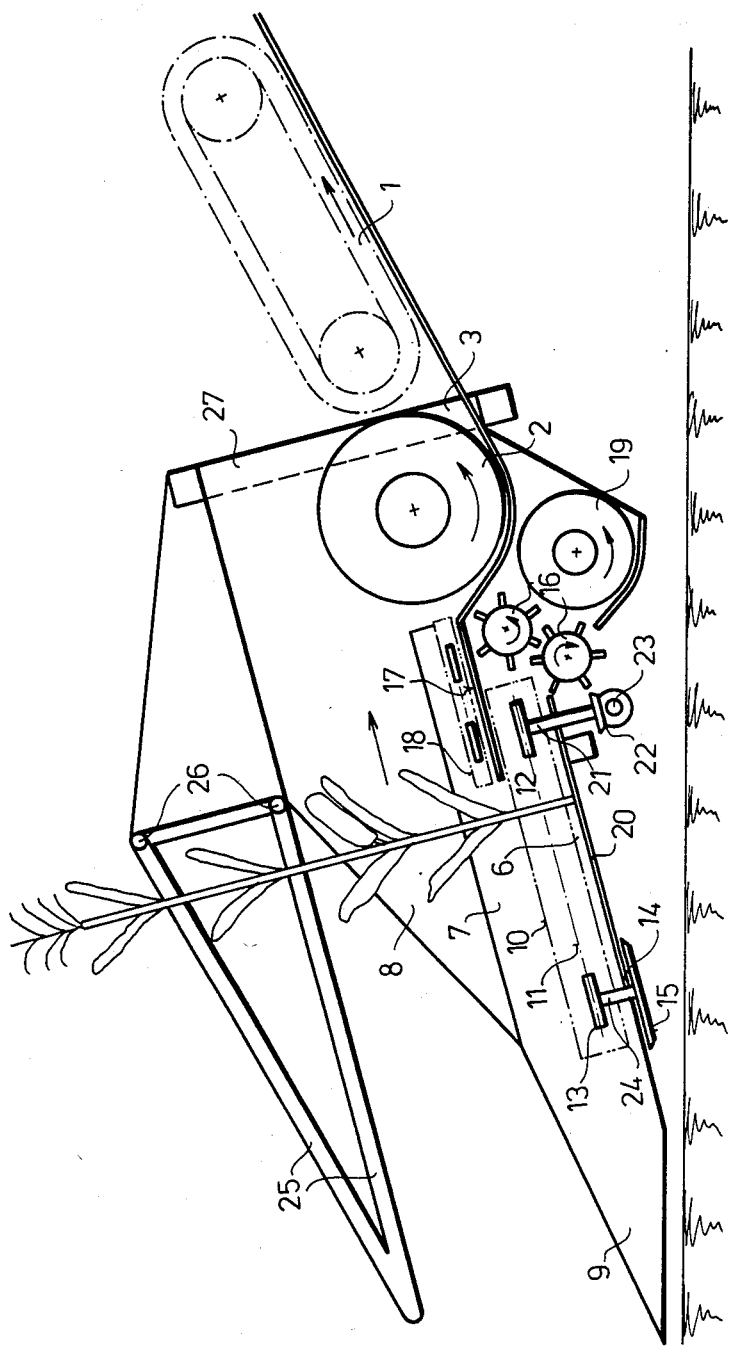
FIG. 3 is a sectional side view of an adapter as shown in FIG. 1 or 2.

The sectional side view of the adapters shown in FIGS. 1 and 2. is illustrated in FIG. 3., first of all for the representation of the reclining positions of the structural parts.

The elevator channels 6 and the gathering chains 11 built into them are on a common plane at an acute angle to the horizontal.

The diagram illustrates the position of the ribbed or toothed ribbed pair of stalk gathering rolls 16 between the crop gathering auger 2 and elevator channels 6 at the end of the elevator channels at the feeding hole 3,—the axis of which is at right angle to the direction of motion of the machine—in relation to the lower part 20 of the elevator channels 6 and to the transport parts 10 of the gathering chains 11 for the purpose of efficient crop transfer and reception.

The stalk gathering auger 19 is arranged behind the pair of stalk gathering rolls 16 and below the crop gathering auger 2. The stalk gathering auger 19 can be dispensed with according to the requirements.

The snapping strips 17 are above the pair of stalk gathering rolls 16 and above the part of the gathering chains 11 at the feeding hole, and the conveyor chains provided with the crop transport parts 18 driven through the shafts of the driving gears 12 of the gathering chains 11 are arranged above the snapping strips 17. The snapping strips 17 are interconnected with the trough of the gathering auger 2. The rows are surrounded by the intermediate shields 7 and extreme enclosing shields 8 and with the toes 9.

The gathering chains 11 are driven by the driving gears 12 and driven gears 13. The shaft 21 of the driving gears 12 are driven from the driving shaft 23 through a pair of bevel gears 22. The driving shaft 23, the pair of stalk gathering rolls 16, the crop gathering auger 2 and the stalk gathering auger 19 are driven from the power plant of the ground machine not shown in the diagram. The cutter assemblies 15 provided with counter blades, suitably with star-shaped blades are arranged on the shafts 24 of the driven gears 13 in the vicinity of the lower part 20 of the elevator channels 6.

The rows—according to the varying row space—are displaced on the driving shaft 23, or on the frame supports in case of parallel row arrangement, and are adjustable around the centre of the shafts 21 of the driving gears 12 in case of converging row arrangement.

In the top view of the adapter the divider 25 is surrounded by the shields 8 and toes 9 of the extreme elevator channels and by the lower part of the gathering chains 11 at the back. The rear part 26 of the divider 25 is arranged in front of the pair of stalk gathering rolls 16 at the height conforming to the crop, and it is adjustable in horizontal and vertical directions. The divider 25 can be dispensed with, depending on the crop. The connecting piece 27 ensuring the connection between the adapter and the different ground machines is arranged in front of the feeder assembly 1 at the feeding hole 3 of the crop gathering auger 2.

Figure 4:
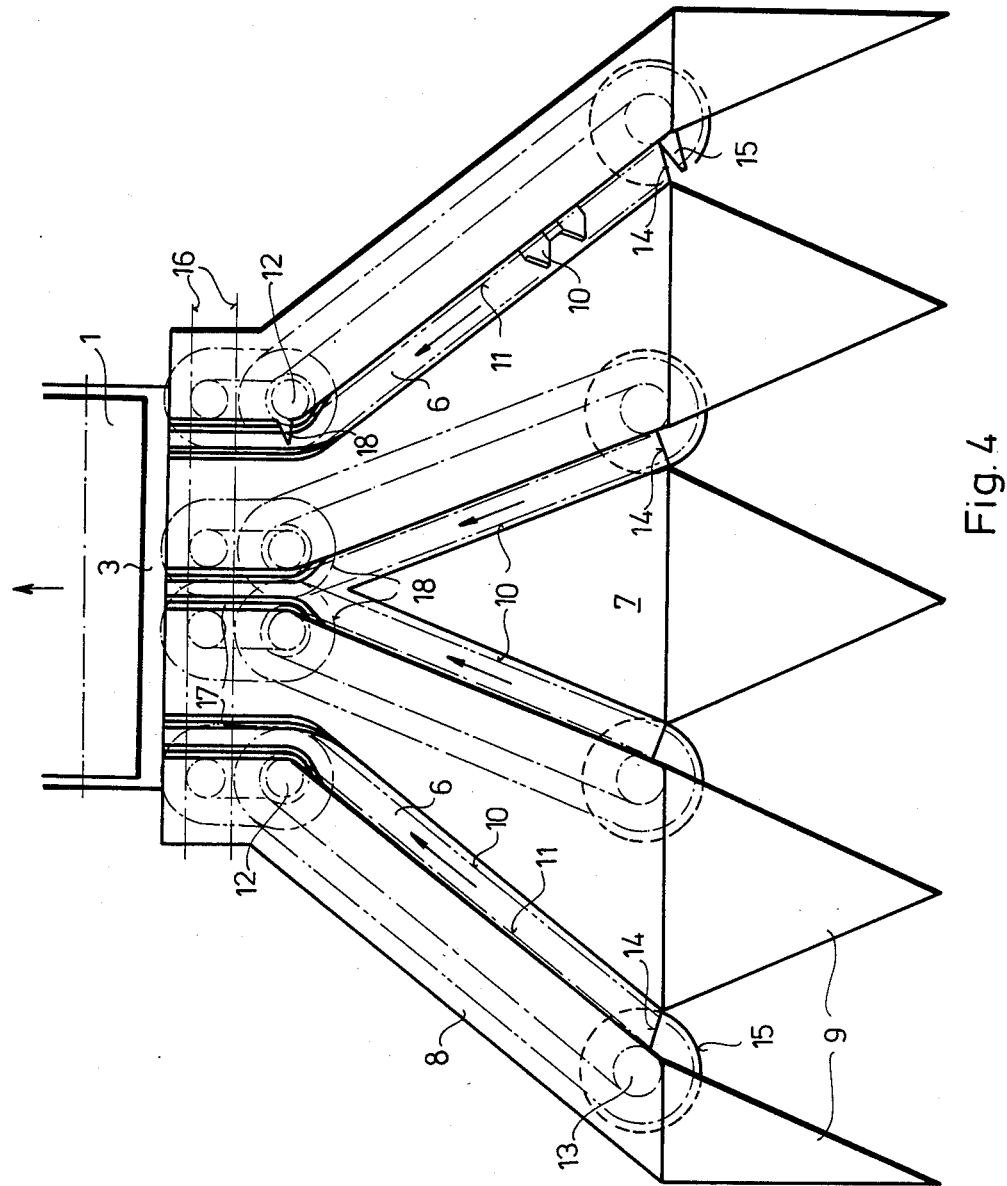
FIG. 4 is a top view of a four-row converging-channel adapter.

The four-row construction of the adapter according to the invention is shown in FIG. 4. Differently from the six-row adapter shown in FIGS. 1-3., here the crop gathering auger 2 and stalk gathering auger 19 are dispensed with. The elevator channels 6 and the gathering chains 11 in the elevator channels 6 are in convergent arrangement. The gathering chains 11 are built in as a single chain and the extreme rows are independently driven. Naturally the gathering chains 11 used as a single chain can be co-ordinated as a pair of chains directly before the feeding hole 3 of the elevator channels 6. This is illustrated in the two intermediate rows.

The pair of stalk gathering rolls 16 are arranged before the feeder assembly 1 and between the elevator channels 6 at the end of the elevator channels at the feeding hole 3 at right angle to the direction of motion of the machine, the snapping strips 17 are above the pair of stalk gathering rolls 16, and the conveyor chains provided with the crop transport parts 18 are above the snapping strips.

Figure 5:
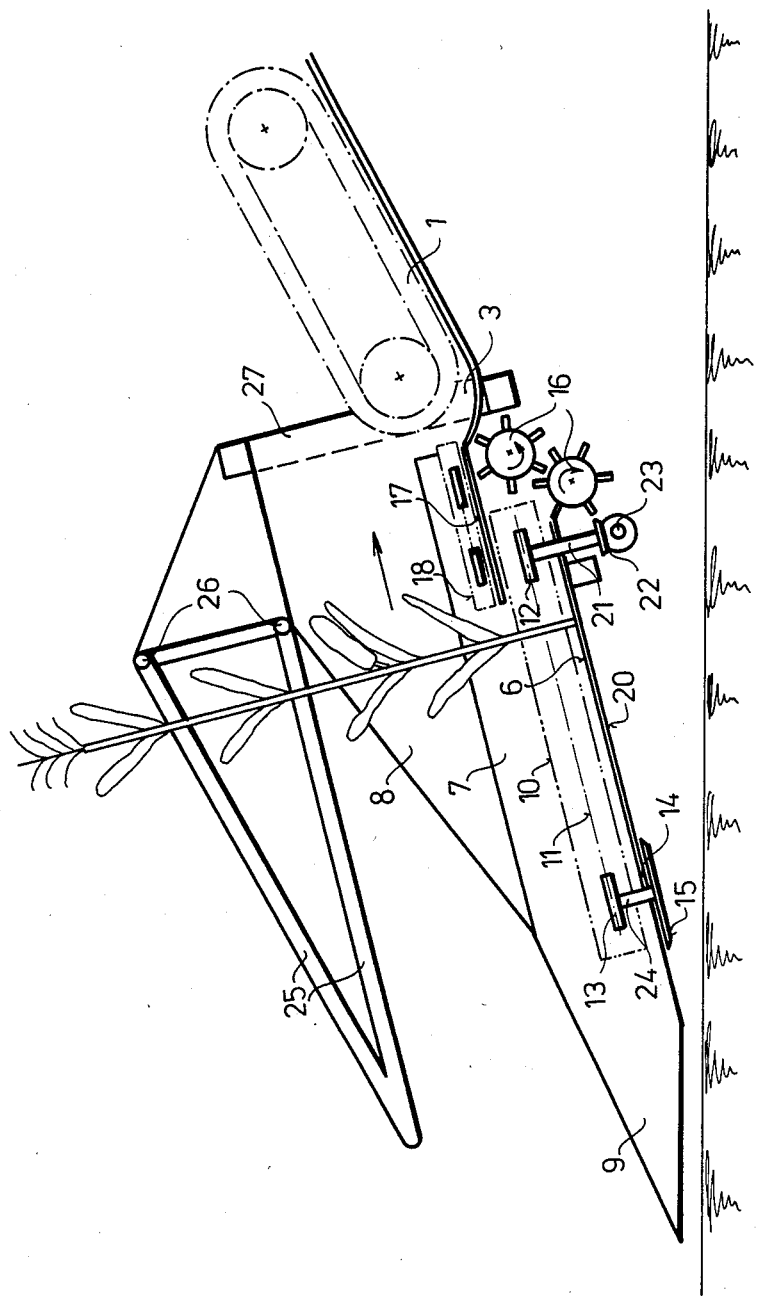
FIG. 5 is a sectional side view of the adapter shown in FIG. 4.

FIG. 5, shows the sectional side view of the adapter shown in FIG. 4., first of all for demonstration of the relative position of the structural parts. The snapping strips 17 are interconnected with the trough of the feeder assembly 1. The rows conforming to the varying row spaces are adjustable around the centre of the shafts 21 of the driving gears 12. The connecting piece 27 ensuring the connection between the adapter and the different ground machines is before the feeder assembly 1 at the feeding hole of the crop transport parts 18.

Naturally the augers too can be built into the elevator channels 6 in place of the gathering chains 11 in the elevator channels 6, as shown in FIGS. 1-5.

Figure 6:
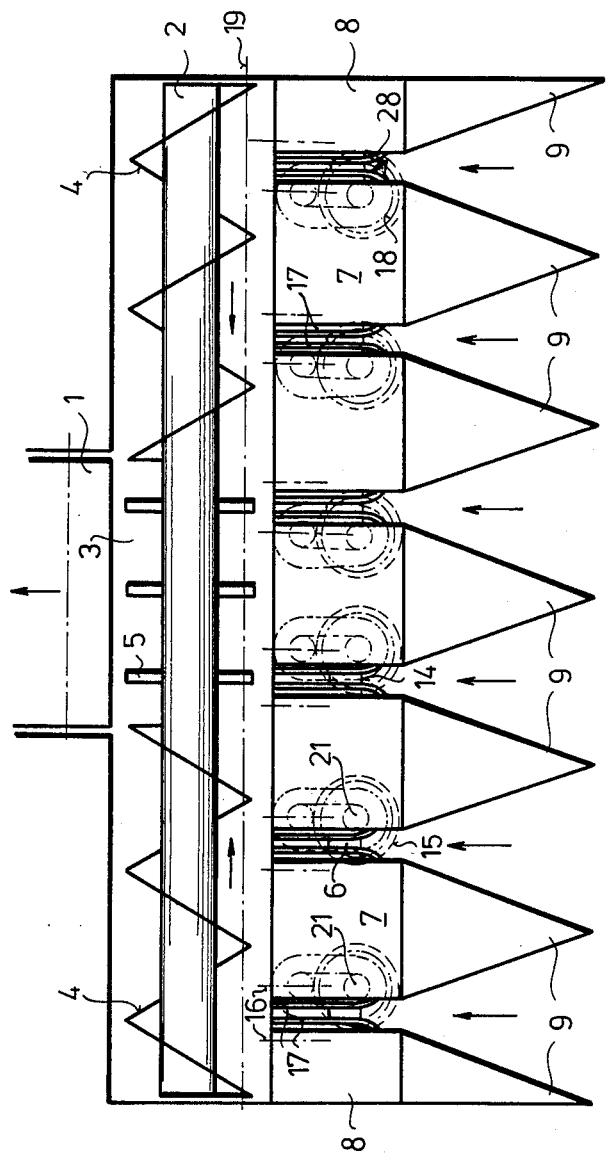
FIG. 6 is a top view of another embodiment of a six-row adapter rotating on common shaft with the cutter assembly, provided with transport parts.

The six-row adapter according to the invention is shown in FIG. 6. Differently from the construction of the adapters shown in FIGS. 1-5., here the gathering chains in the elevator channels are dispensed with. The reclining rotary transport parts 28 of suitable height and spaced according to the crop are on common shafts 21 with the cutter assembly 15 fitted with the star-shaped blades, provided with counter blades 14 at the inlet part of the very short elevator channels 6.

Only those parts of the rotary transport parts 28 in one of the extreme rows are shown which are visible in the elevator channel 6, elsewhere the envelope curve of these parts is shown only.

The pair of stalk gathering rolls 16—the axis of which is in the direction of motion of the machine—is arranged between the crop gathering auger 2 and the elevator channels 6 at the end of the elevator channels 6 at the feeding hole 3, and the snapping strips 17 are above the pair of stalk gathering rolls 16, while the conveyor chains provided with the crop transport parts 18 are above the snapping strips 17.

Figure 7:
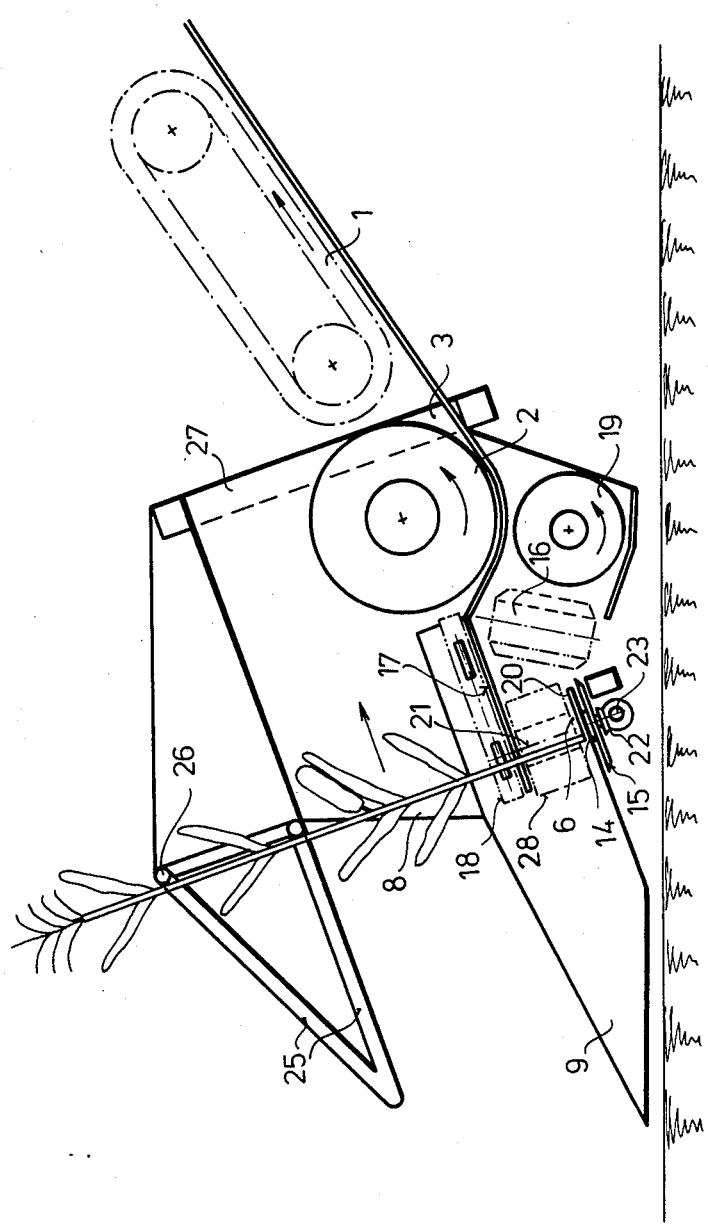
FIG. 7 is a sectional side view of the adapter shown in FIG. 6.

FIG. 7. shows the sectional side view of the adapter illustrated in FIG. 6., first of all for demonstration of the relative position of the structural parts. The position of the pair of stalk gathering rolls 16 in relation to the lower part 20 of the elevator channels 6, and to the rotary transport parts 28 is demonstrated in the diagram. However the position of the pair of stalk gathering rolls 16 in given case may concur with the direction of crop transport and crop transport parts. Apart from this, in given case the incline of the pair of stalk gatheting rolls 16 is also variable. The crop conveyor chains provided with the crop transport parts 18 are driven through the shafts 21.

The common shafts 21 are driven from the driving shaft 23 suitably with the pair of bevel gears 22. The rows are adjustable on the driving shaft 23 according to the different row spaces. Naturally the rotary transport parts 28 can be divided into two units above each other, furthermore they can be arranged not only on the common shafts with the cutter assembly on one or both sides of the elevator channels, but also as a twin unit on the countershafts.

Figure 8:
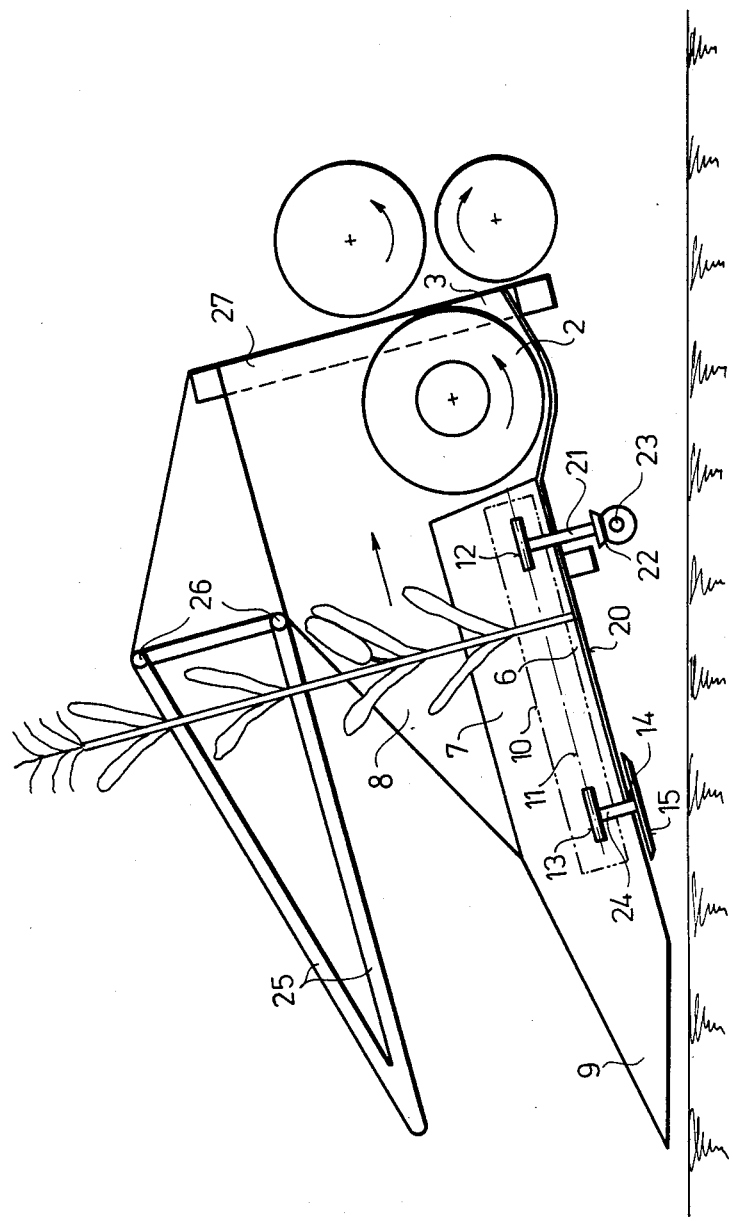
FIG. 8 is a sectional side view of the six-row adapter augmented with an assembly as shown in FIGS. 1-3.

FIG. 8. shows the sectional side view of the six-row adapter derived from the construction shown in FIGS. 1-3., first of all to demonstrate that the adapter suitable mainly for the harvesting of silage corn and realized with the elimination of the pair of stalk gathering rolls 16, snapping strips above the stalk gathering rolls 16, crop transport parts 18 driven through the driving gear shafts 12 and units of the stalk gathering auger 19, is formed mainly with standardized elements. The diagram demonstrates well that by the elimination of the units, the adapter was realized with the combination of the lower part 20 of the elevator channels 6 at the feeding hole 3 and the trough of the crop gathering auger 2 in front of the feeder assembly 1.

FIG. 9. shows the sectional side view of the four-row adapter derived from the constructions shown in FIGS. 4-5. The diagram demonstrates that the extensively standardized adapter suitable for the harvesting mainly of silage corn was realized with the elimination of the pair of stalk gathering rolls 16, snapping strips 17 above the pair of stalk gathering rolls 16 and crop transport parts 18, by combination of the lower part 20 of the elevator channels 6 at the feeding hole 3, and the lower part of the connecting piece 27 in front of the feeder assembly 1.

FIG. 10. shows the sectional side view of the six-row adapter derived from the constructions shown in FIGS. 6-7. The diagram demonstrates the mainly standardized adapter suitable mainly for the harvesting of silage corn and sunflower, realized with the elimination of the pair of stalk gathering rolls 16, snapping strips 17 above the pair of stalk gathering rolls 16 and the units of the crop gathering auger 19, through the combination of the lower part 20 of the elevator channels 6 at the feeding hole 3 and trough of the crop gathering auger 2 in front of the feeder assembly 1.

In the constructions of the multi-row adapters according to the invention shown in FIGS. 1-7., the transport part of the combine's feeder assembly is shown, while the constructions of the mainly standardized multi-row adapters of FIGS. 8-10., derived from elimination of certain units, the pair of stalk gathering rolls of the feeder assembly of the chopping machine is shown. According to the diagrams presented so far it is evident that the multi-row adapter according to the invention can be developed still in many further alternatives and serial numbers, depending on the load bearing capacity and output of the given combine or chopping machine and in knowledge of the properties of the crop to be harvested.

Operation of the multi-row adapter according to the invention is described in the following.

The multi-row adapter according to the invention used for the harvesting mainly of corn and sunflower, as well as for the simultaneous harvesting of corn and sunflower stalk, can be mounted on any combine or mobile chopping machine, depending on the type of the crop.

The gathering chains 11 provided with transport parts 10, or the rotary transport parts 28 are driven from the power source of the ground machines as to transport from the toes 9 towards the pair of stalk gathering rolls 16 in the direction of the "black" arrows. The standing row crop mainly those with long stalk are transported by toes 9 towards the inlet of the elevator channels 6, where the stalks are cut by the star-shaped blades of the cutter assembly 15, so that simultaneously with the cutting they are held or supported by the transport parts 10 of the gathering chains 11, or by the rotary transport parts 28. The gathering chains 11 or the rotary transport parts 28 transport each of the cut crop in their supported position towards the pair of stalk gathering rolls 16, while the stalks mainly in the extreme elevator channels 6 are prevented from falling out by the part of the stalk divider 25 which follows the the shields 8 of the extreme elevator channels. As soon as the crop with long stalk transported by the gathering chains 11 or by the rotary transport parts 28 approach the transfer part of the elevator channels 6 according to the given extent, it contacts the rear part 26 of the stalk divider, which is arranged in front of the pair of stalk gathering rolls 16 at the height conforming to the crop.

When the crop with long stalk supported also at the rear part 26 of the stalk divider 25 guided by the gathering chains 11 or by the rotary transport parts 28 between the snapping strips 17 reaches the ribbed or toothed ribbed pair of stalk gathering rolls 16 arranged at the feeding hole 3 of the elevator channels 6 according to the transfer and reception, the pair of stalk gathering rolls 16 rotating at relatively high peripheral speed and synchronized with the height of the crop to be separated and at the rate of the transport velocity pull down the stalk, while the snapping strips 17 snap off and detach the cobs and the sunflower from the stalk.

The detached crop is transported by the crop transport parts 18 through the crop gathering auger 2 or directly through the feeding hole 3 to the feeder assembly 1 of the different ground machines. Thereafter the crop passes into the threshing drum or into the chopping drum, depending on the type of the crop and on the ground machine.

The corn and sunflower stalks in a slightly broken, crushed condition are placed on the ground by the pair of the stalk gathering rolls 16 through the stalk gathering auger 19 or directly in a slightly arranged form between the wheels of the combine together with the material discharged from the combine after threshing.

In case of the mainly standardized multi-row adapter derived by elimination of certain units, used mainly for the harvesting of silage corn, sunflower and soya, the crop transported by the gathering chains 11 or by the rotary transport parts 28 and guided at the rear part 26 of the stalk divider passes directly or through the crop gathering auger 2 to the feeder assembly 1 of the different ground machines. Thereafter the crop passes into the chopping drum or into the threshing drum, depending on the crop type and on the ground machine.

The favourable properties of the apparatus according to the invention are summed up in that—apart from the multi-purpose characteristic—the construction is relatively simple, the weight is light and the power requirement is low; conforming to the output of the high capacity combines and chopping machines mainly standardized adapter in adequate serial number can be developed and their output exceeds that of the similar conventional apparatuses. The multi-purpose characteristic of these adapters, particularly for the harvesting of corn and sunflower, as well as the stalk valuable first of all in respect of energy utilization, furthermore the suitability of the derived adapters for the harvesting of silage corn, sunflower and soya, i.e. for the complete harvesting of the various crops represent a highly significant advantage.

The advantage in respect of construction is that the parallel gathering chanis and cutter assemblies as well as the crop transport parts arranged in rows and usually only on one side allow a very simple construction of the adapters, they can be built up with the same basic parts and their units can be easily eliminated to be suitable for the different technological processes, thereby ensuring the introduction of extensive standardization, which results in economical mass production, furthermore they ensure the adaptability to the different row spaces.

Despite the considerably different widths of the feeder assemblies of the various combines and chopping machines the basic spaces are easily adaptable with the aid of the connecting piece used at the feeding hole to the different ground machines, while the extensive standardization is preserved.

Since the adapter is formed with relatively short and a single gathering chain in each row, the mechanism comprises a small number of parts, thus its specific weight compared to the width of the adapter is low and it does not load detrimentally the front wheels of the ground machines, which allows the use of a large number of adapters. The cutter assembly of the adapter fitted with star-shaped knives can be lowered nearly to the ground during operation in case of need, thus the stubble will be uniform and its height minimal.

What we claim is:

1. A multi-purpose crop harvesting adapter for the harvesting of corn and sunflower row crops and adapted to be attached to a basic harvesting machine provided with a take-away device for a portion of the harvested crop, said adapter comprising:
   means defining a plurality of closed-bottom channels each adapted to be aligned with a row of said crop and inclined upwardly and rearwardly with respect to a direction of advance of said machine for guiding stalks of said crop rearwardly toward said machine;
   cutting means effective at a lower portion of each of said channel for severing the stalks received thereby from the ground;
   respective conveyors extending along each of said channels for shifting said stalks rearwardly therealong;
   a respective pair of snapping strips at an upper end of each of said channels lying inwardly of walls of the respective channels for separating said portion of the crop from said stalks by the coaction of said conveyors and said snapping strips;

means for guiding said portion of said crop from the respective snapping strips to said take away device; and a pair of stalk-gathering rolls disposed below said snapping strips and said means for guiding and receiving said stalks from said channels upon the separation of said portion from said stalks, said stalk gathering rolls being oriented at right angles to said direction, said stalks being thereafter deposited on the ground in a swath enabling subsequent pick up.

2. An adapter as defined in claim 1, further comprising a stalk-gathering auger disposed rearwardly of said stalk gathering rolls for depositing said stalks on the ground.

3. The adapter defined in claim 2 wherein said stalk gathering rolls are formed with respective units each having a width corresponding to the width of a respective one of said channels and being ribbed to enable the displacement of said stalks.

4. The adapter defined in claim 1 wherein said stalk gathering rolls have variable angle of inclination.

* * * * *